(12) United States Patent
Thiel et al.

(10) Patent No.: US 11,052,802 B2
(45) Date of Patent: Jul. 6, 2021

(54) DEVICE FOR ACTUATING MULTIPLE LOADS

(71) Applicant: SCHUKRA GERÄTEBAU GMBH, Berndorf (AT)

(72) Inventors: Thomas Thiel, Bonn (DE); Martin Fritzsche, Gräfenberg (DE); Frank Palinsky, Schwabach (DE)

(73) Assignee: SCHUKRA GERÄTEBAU GMBH, Berndorf (AT)

( * ) Notice: Subject to any disclaimer, the term of this patent is extended or adjusted under 35 U.S.C. 154(b) by 98 days.

(21) Appl. No.: 16/499,730

(22) PCT Filed: Apr. 5, 2018

(86) PCT No.: PCT/EP2018/058792
§ 371 (c)(1),
(2) Date: Sep. 30, 2019

(87) PCT Pub. No.: WO2018/185250
PCT Pub. Date: Oct. 11, 2018

(65) Prior Publication Data
US 2021/0107388 A1 Apr. 15, 2021

(30) Foreign Application Priority Data

Apr. 5, 2017 (EP) .................................... 17164985

(51) Int. Cl.
*B60N 2/90* (2018.01)
*B60N 2/64* (2006.01)
(Continued)

(52) U.S. Cl.
CPC .............. *B60N 2/929* (2018.02); *B60N 2/22* (2013.01); *B60N 2/64* (2013.01); *B60N 2/806* (2018.02);
(Continued)

(58) Field of Classification Search
CPC .......... B60N 2/929; B60N 2/806; B60N 2/22; B60N 2/64; B60N 2/0232; B60N 2002/0236; F16C 1/10; F16C 2326/08
See application file for complete search history.

(56) References Cited

U.S. PATENT DOCUMENTS 4,817,452 A * 4/1989 Burkey ................. B62K 23/00
                                                  188/2 D
6,026,705 A * 2/2000 Ficyk ..................... F16C 1/101
                                                  292/195
(Continued)

FOREIGN PATENT DOCUMENTS

DE       102008034770 A1    2/2010
EP            2835280 A1    2/2015
(Continued)

OTHER PUBLICATIONS

International Search Report for Application No. PCT/EP2018/058792 dated Jun. 13, 2018 (9 pages).
(Continued)

*Primary Examiner* — Philip F Gabler
(74) *Attorney, Agent, or Firm* — Michael Best & Friedrich LLP

(57) ABSTRACT

A device (219) includes a housing (301) and a link (320) displaceably arranged in the housing (301) and having an input port (323) configured to receive an input force (269) oriented along a first axis (91), a first output port (321) configured to provide a first output force (261) based on the input force (259, 269), and a second output port (322) configured to provide a second output force (262) based on the input force (259, 269). The link (320) is configured to move the first output port (321) from a start position (291) to a stop position along the first axis (91) by a first distance in response to receiving the input force (269) and to move the second output port (322) from the start position (291) to
(Continued)

the stop position (294) along the first axis (91) by a second distance (422) in response to receiving the input force (259, 269). The first distance is smaller than the second distance.

31 Claims, 18 Drawing Sheets

(51) Int. Cl.
    *B60N 2/806*     (2018.01)
    *F16C 1/10*     (2006.01)
    *B60N 2/22*     (2006.01)
    *B60N 2/02*     (2006.01)

(52) U.S. Cl.
    CPC .............. *F16C 1/10* (2013.01); *B60N 2/0232* (2013.01); *B60N 2002/0236* (2013.01); *F16C 2326/08* (2013.01)

(56) References Cited

U.S. PATENT DOCUMENTS

| | | | | |
|---|---|---|---|---|
| 6,050,641 | A * | 4/2000 | Benson | B60N 2/66 297/284.4 |
| 6,814,407 | B2 * | 11/2004 | Mundell | A47C 7/465 297/284.2 |
| 7,770,972 | B2 * | 8/2010 | Popa | B60N 2/0296 297/284.4 |
| 8,282,150 | B2 * | 10/2012 | Clor | B60N 2/305 296/65.09 |
| 8,616,647 | B2 * | 12/2013 | Chen | B62B 9/104 297/364 |
| 9,102,246 | B2 * | 8/2015 | Blendea | B60N 2/20 |
| 10,507,741 | B2 * | 12/2019 | Tindall | B60N 2/0296 |
| 2008/0001412 | A1 * | 1/2008 | Nozawa | E05B 81/16 292/2 |
| 2017/0204949 | A1 * | 7/2017 | Dunn | B60N 2/832 |

FOREIGN PATENT DOCUMENTS

| | | |
|---|---|---|
| JP | 2001050241 A | 2/2001 |
| JP | 2008008118 A | 1/2008 |
| JP | 2016016493 A | 2/2016 |

OTHER PUBLICATIONS

European Patent Office Extended Search Report for Application No. 17164985.8 dated Oct. 25, 2017 (7 pages).

* cited by examiner

DEVICE FOR ACTUATING MULTIPLE LOADS

TECHNICAL FIELD

Various examples generally relate to providing a first output force to a first load and a second output force to a second load. Various examples specifically relate to actuating multiple loads in a sequenced manner.

BACKGROUND

Motorized actuators are widely employed to provide automated operation. For example, motorized actuators are employed in vehicles to operate seating functionality. Motorized actuators may be used to displace a headrest of a seat, to adjust a seating depth, or recline the backrest of the seat. For this, a corresponding actuation mechanisms, e.g., a lock, recliner, or moving part, may be actuated.

Motorized actuators can be expensive and complex. To reduce the complexity, typically the design of the motorized actuators is carefully chosen in view of the load to be handled.

Sometimes, when multiple different loads are desired to be actuated by the same motorized actuator, it may be required to design the motorized actuators so as to handle a sum of the resistances provided by the two loads. It can require significant forces to overcome the sum of the resistances. This may result in complexity of the motorized actuator. For example, applications are known where, both, a locking mechanism of a headrest is to be unlocked, as well as a locking mechanism of a backrest of the seat is to be unlocked by a single motorized actuator. In reference implementations, it can be required to design the motorized actuator to handle the sum of the resistances imposed by unlocking the locking mechanism of the headrest and unlocking the locking mechanism of the backrest. This, however, can require a complex and expensive motorized actuator, because the sum of the resistances can require a significant force to be output by the motorized actuator.

SUMMARY

Therefore, a need exists for advanced techniques of actuating multiple loads. In particular, a need exists for techniques of actuating multiple loads which overcome or mitigate at least some of the above-identified restrictions and drawbacks.

This need is met by the features of the independent claims. The dependent claims define embodiments.

A device includes a housing and a link. The link is displaceably arranged in the housing. The link has an input port. The input port is configured to receive an input force. The input force is oriented along a first axis. The link also has a first output port. The first output port is configured to provide a first output force based on the input force. The link also has a second output port configured to provide a second output force based on the input force. The link is configured to move the first output port from a start position to a stop position along a first axis by a first distance and in response to receiving the input force. The link is further configured to move the second output port from the start position to the stop position along the first axis and by a second distance in response to receiving the input force. The first distance is smaller than the second distance.

A system includes such a device, and a first load, as well as a second load. The first load is attached to the first output port. The second load is attached to the second output port.

A device includes a housing and a link displaceably arranged in the housing. The link has an input port configured to receive an input force oriented along a first axis, a first output port configured to provide a first output force based on the input force, and a second output port configured to provide a second output force based on the input force. The link is configured to displace from a start position to a stop position, said displacing including a translation and a rotation. A distance between the first output port and the input port along the first axis and in the start position is larger than a distance between the second output port and the input port along the first axis and in the start position.

A method includes displacing a link arranged in a housing and having an input port configured to receive an input force oriented along a first axis, a first output port configured to provide a first output force based on the input force, and a second output port configured to provide a second output force based on the input force. By said displacing, the first output port is moved from a start position to a stop position along the first axis by a first distance in response to receiving the input force and the second output port is moved from the start position to the stop position along the first axis by a second distance in response to receiving the input force. The first distance is smaller than the second distance.

A method includes translationally and rotationally displacing a link arranged in a housing between a start position to a stop position. The link has an input port configured to receive an input force oriented along a first axis, a first output port configured to provide a first output force based on the input force, and a second output port configured to provide a second output force based on the input force. A distance between the first output port and the input port along the first axis and in the start position is larger than a distance between the second output port and the input port along the first axis and in the start position.

By such techniques, it is possible to provide different distances of travel of an actuation member (stroke) for actuating the first load and the second load, respectively. By providing different strokes for actuating the first load and the second load, respectively, it is in turn possible to separate peaks of the first output force and the second output force in time domain. Hence, by providing different strokes to the first load and the second load, it is in other words possible to sequence actuation of the first load and the second load. In other example use cases, it is possible to limit the maximum force output to the first and second load (load limiting).

Load limiting and/or load sequencing, in turn, enables to relax the specification requirements imposed on a motorized actuator configured to provide the input force. For example, by such techniques of load limiting or load sequencing, a time-domain profile of the input force may be obtained which has a maximum that is smaller than the sum of the maximums of a first resistance imposed by the first load and a second resistance imposed by actuating the second load, wherein the first and second resistances counteract the input force.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
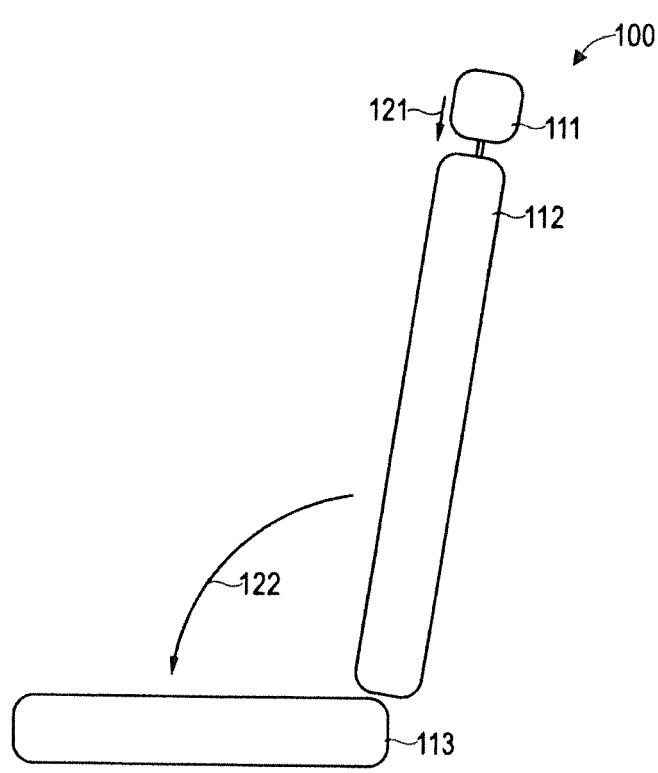
FIG. 1 schematically illustrates a seat including a headrest and a backrest according to various examples, wherein the headrest and the backrest can be actuated by a motorized actuator.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling.

Hereinafter techniques of actuating two loads are described. The two loads may include actuating mechanisms that are actuated by a motorized actuator.

The techniques described herein may be employed to limit the output force (load limiting). For example, the output force may be limited by reducing the resistance imposed by one of two loads on an input force provided by the motorized actuator, i.e., by limiting the effective resistance seen by the motorized actuator over the course of actuation. Then, the maximum force required to be provided by the motorized actuator may be limited.

The techniques described herein may further be employed to actuate the two loads in a sequenced manner (load sequencing). Hence, first, a first one of the two loads is actuated, and then a second one of the two loads is actuated. Such sequenced actuation of the two loads, again, enables to reduce the maximum force to be provided by a motorized actuator. In particular, it may not be required to design the motorized actuator so as to provide a maximum force which corresponds to the sum of the maximums of the resistances imposed by, both, the first and second loads. Rather, it can be sufficient to design the motorized actuator so as to provide a maximum force which corresponds to the larger one of the maximums of the resistances imposed by the first and second loads.

In examples, a sequencing of the actuation of the two loads and/or a load limiting is achieved by actuating the first and second loads with different strokes of, e.g., a Bowden cable. Output ports associated with the different loads may move by different distances.

For example, for load sequencing, the Bowden cable of a first load can be designed to impose a resistance which varies over the course of the stroke, respectively the duration of the actuation. For example, the maximum of the resistance of the first load can be offset in time-domain from the maximum of the resistance of the second load over the course of actuation. Then, the motorized actuator provides, initially, a force to counteract the resistance imposed by, e.g., the first load; and, subsequently, provides a force to counteract the resistance imposed by the second load.

Such techniques may be achieved by a device which includes a housing and a link which is displaceably arranged within the housing. The link may be configured to receive the input force from the motorized actuator and to output forces to, both, the first and second loads. By appropriately configuring the displacement of the link within the housing, it is possible to implement the different strokes when actuating the first and second loads. For example, the displacement may include a rotation and a translation which are superimposed. Furthermore, by appropriately configuring the displacement of the link within the housing, it is possible to match the stroke-dependent profiles of the resistances imposed by the first and second loads to the input force, respectively.

In an example, the link includes an input port configured to receive the input force, e.g., from the motorized actuator and via a cable. The link also includes a first output port configured to provide a first output force to a first load, e.g., via a Bowden cable and to a corresponding actuation member of the first load. The link also includes a second output port configured to provide a second force to a second load, e.g., via a further Bowden cable and to a corresponding actuation member of the second load.

As a general rule, the input port and one of the first output port and the second output port may be co-located. For example, it is possible that the input port and the second output port are co-located; then, it would be possible that the cable providing the input force and the cable to the actuation member of the second load are integrally formed.

In an example, the link can be configured to move the first output port from a start position to a stop position along a first axis—which is co-linear with the input force—by a first distance. The link can be configured to move the second output port from the start position to the stop position along the first axis by a second distance. The first output port and/or the second output port may additionally move along the second axis, e.g., by corresponding third and fourth distances.

The first distance may be smaller than the second distance. Thereby, a load-dependent stroke can be provided.

Alternatively or additionally, a distance between the first output port and the input port along the first axis may be smaller than a distance between the second output port and the input port along the first axis, in the start position. Thereby, a rotation of the link provides the load-dependent stroke.

Such techniques enable to implement the motorized actuator in a comparably simple manner. In particular, the maximum force that needs to be provided by the motorized actuator can be comparably limited.

FIG. 1 schematically illustrates aspects with respect to a seat 100. The seat includes multiple displaceable parts, e.g., a headrest 111, a backrest 112. The seat also includes a base 113. It is possible to actuate an actuating mechanism of the headrest 111. For example, it would be possible to unlock a locking mechanism of the headrest 111. The respective displacement 121—which may result due to gravity in response to said unlocking, i.e., the headrest "falling down"—is illustrated in FIG. 1. It is also possible to actuate an actuating mechanism of the backrest. For example, it would be possible to unlock a locking mechanism of the backrest 112; thereby, it is possible to trigger reclining of the backrest 112 towards the base 113. The respective displacement 122 is illustrated in FIG. 1. This displacement may be facilitated by a coil spring or another storage means to store mechanical energy in the locked position of the backrest 112, which mechanical energy may then be used to execute the displacement 122.

Hereinafter, techniques are described which enable efficient actuation of, both, the actuation mechanism of the headrest 111, as well as the actuation mechanism of the backrest 112. In particular, techniques are described which enable combined actuation of, both, the actuation mechanism of the headrest 111, as well as the actuation mechanism of the backrest 112 by a single motorized actuator (not illustrated in FIG. 1).

Figure 2:
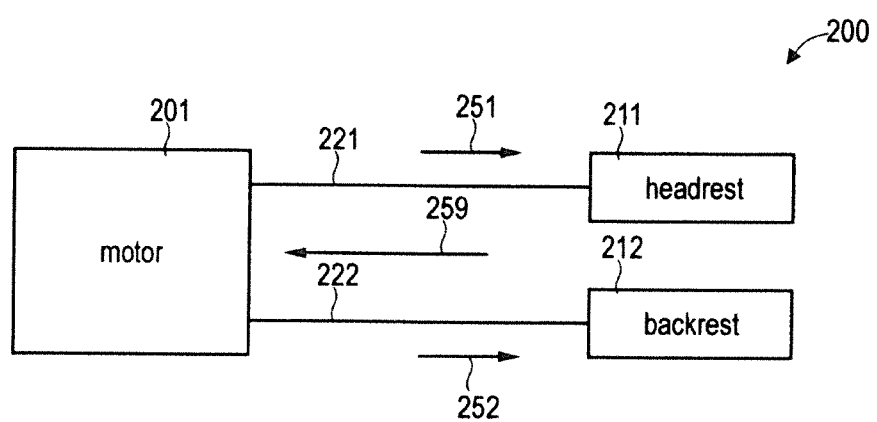
FIG. 2 schematically illustrates actuation of loads of the headrest and the backrest by the motorized actuator according to a reference implementation.

FIG. 2 schematically illustrates aspects with respect to the system 200 including a motorized actuator 201 and loads 211, 212. For example, the load 211 could be associated with headrest 111, e.g., a locking mechanism of the headrest 111 or another actuation mechanism. A cable 221 is provided which moves and thus provides a stroke to actuate the load 211. The load 212 could be associated with the backrest 112, e.g., a locking mechanism of the backrest 112 or another actuation mechanism. A cable 222 is provided which moves and thus provides a stroke to actuate the load 212. For example, the cable 221 and/or the cable 222 may be Bowden cables.

FIG. 2 schematically illustrates a reference implementation of the system 200. Here, the motorized actuator 201 is required to provide a force 259 which is twice as large as the individual resistances 251, 252 imposed by the loads 211, 212. This finding can be motivated by the time-domain profile illustrated in FIG. 3.

Figure 3:
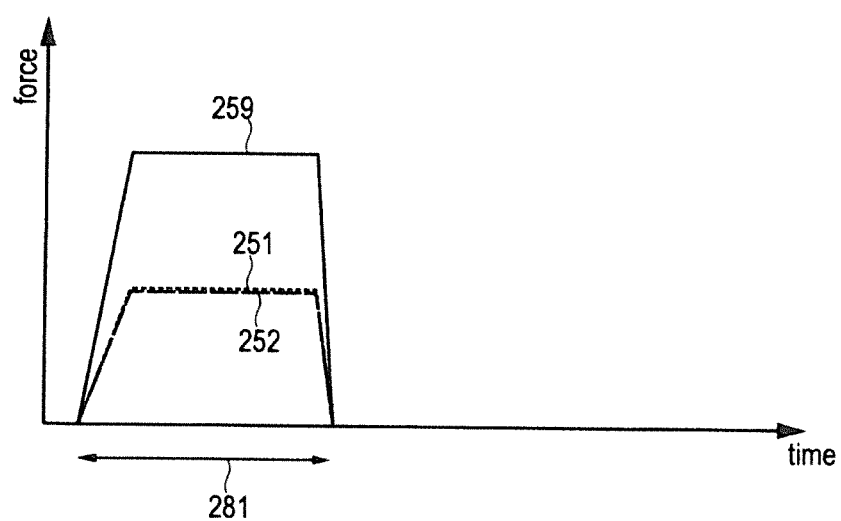
FIG. 3 schematically illustrates the time-domain profile of a force provided by the motorized actuator according to the reference implementation of FIG. 2.

FIG. 3 schematically illustrates aspects with respect to the time-domain profile of the force 259 provided by the motorized actuator 201 in the scenario of FIG. 2. Increasing times also correspond to increasing strokes of the cables 221, 222. The motorized actuator 201 pulls the cables 221, 222 over the course of time by providing the force 259.

FIG. 3 schematically illustrates the absolute values of the force 259 provided by the motorized actuator 201, as well as the absolute values of the resistances 251, 252 (dotted and dashed lines, respectively) of the loads 211, 212, respectively.

As illustrated in FIG. 3, both, the resistances 251, 252 show the same qualitative behavior. Hence, over the course of time—which corresponds to progressing actuation of the loads 211, 212—both resistances 251, 252 increase at substantially the same duration and reach a maximum value. Durations during which the resistances 251, 252 adhere the respective maximum values overlap. To overcome the resistances 251, 252, the motorized actuator 201 is required to provide the force 259 which essentially corresponds to the sum of the resistances 251, 252. The motorized actuator 201 and the loads 211, 212 are coupled directly. Hence, the force 259 takes a large absolute value. This makes design of the motorized actuator 201 complex and costly. Hereinafter, techniques are described which enable to reduce the maximum value of the force 259 that is provided by the motorized actuator 201.

Figure 4:
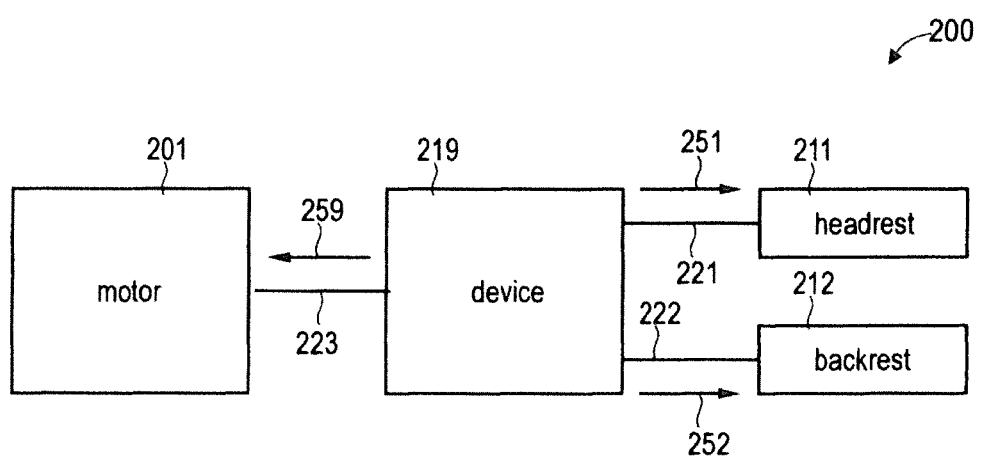
FIG. 4 schematically illustrates actuation of loads associated with the headrest and the backrest by the motorized actuator according to various examples, wherein said actuation is mediated by a device.

FIG. 4 schematically illustrates a system 200 according to various examples. Again, the motorized actuator 201 is required to provide a force 259. However, force 259 can be smaller if compared to the scenario of FIG. 2. In particular, due to a device 219 mediating actuation of the loads 211, 212 by the motorized actuator 201, it is possible to dimension the force 259 to correspond to the larger one of the maximums of the resistances 251, 252. The motorized actuator 201 and the loads 211, 212 are coupled indirectly. The device 219 may be configured to sequence the actuation of the loads 211, 212; then, the device 219 may be referred to as sequencing device 219. In other examples, the device 219 may also be configured to limit the sum of forces output to the loads 211, 212; then, the device 219 may be referred to as limiting device 219. A cable 223 is provided between the motorized actuator 201 and the device 219, e.g., a Bowden cable.

Figure 5:
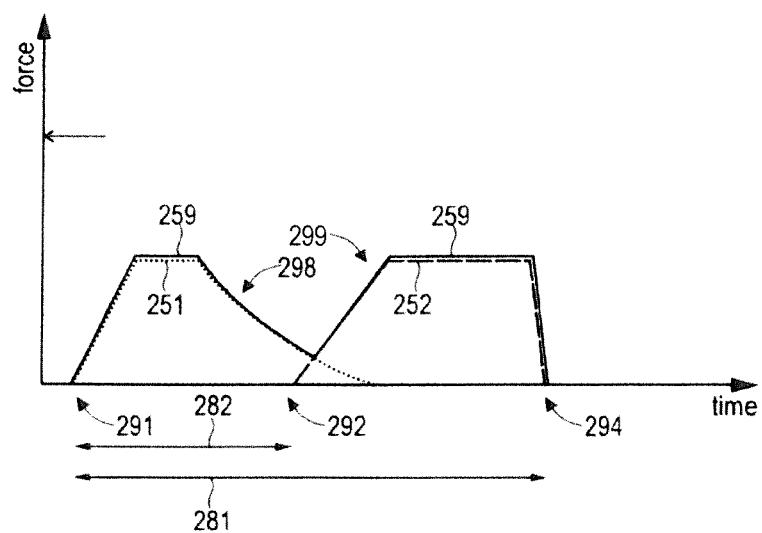
FIG. 5 schematically illustrates the time-domain profile of a force provided by the motorized actuator according to the example implementation of FIG. 4.

FIG. 5 schematically illustrates aspects with respect to the time-domain profile of the force 259 provided by the motorized actuator 201 in the scenario of FIG. 4. Increasing times also correspond to increasing strokes of the cables 221-223. As will be appreciated from a comparison of FIGS. 5 and 3, the overall stroke 281 provided by the motorized actuator 201 is larger in the scenario of FIGS. 4 and 5 as if compared to the scenario of FIGS. 2 and 3.

As illustrated in FIG. 5, the resistances 251, 252 imposed by the loads 211, 212 and counteracting the force 259 show a different qualitative behavior. Hence, over the course of time—which corresponds to progressing actuation of the loads 211, 212—the resistances 251, 252 increase at substantially different durations and also reach their maximum values at different points in time. This is the sequencing provided by the device 219. Durations during which the resistances 251, 252 adhere the respective maximum values do not overlap. Therefore, to overcome the resistances 251, 252, the motorized actuator 201 is required to provide the force 259 which essentially corresponds to the sum of the resistances 251, 252—however, due to the sequencing, this sum takes comparably small values (for illustration, the maximum value of the force 259 in the scenarios of FIGS. 2 and 3 is illustrated by an arrow in FIG. 5).

Figure 6:
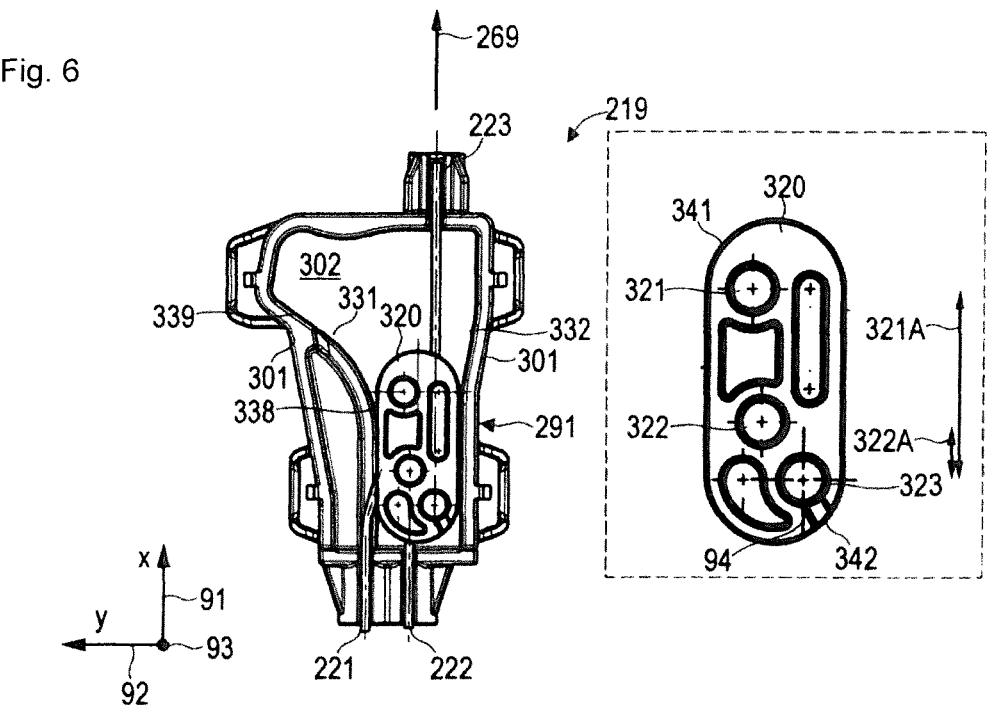
FIG. 6 is a top view of a device according to various examples, wherein the device includes a link, wherein the link is in a start position in FIG. 6.

FIG. 6 illustrates aspects with respect to the device 219. FIG. 6 is a top view of the device 219. The device 219 includes a housing 301. In FIG. 6, the housing 301 is only partially illustrated so as not to obstruct the view of a link 320 which is displaceably arranged within an internal cavity 302 of the housing 301.

FIG. 6 illustrates a start position 291 of the link 320. Here, the link 320 is arranged in a bottom part of the cavity 302 of the housing 301. From the start position 291, the link 320 may displace to a stop position (not shown in FIG. 6).

The inset (dashed lines) of FIG. 6 provides an enlarged view of the link 320. The link 320 may be made from plastic or metal. The link 320 is integrally formed; or may be made from two or more parts. The link 320 is made from rigid material. The link 320 does not include any transmission or elastic element in the example of FIG. 6.

The link 320 includes a curved outer surface 341. The curved character of the outer surface 341 facilitates displacement of the link 320 within the cavity 302, in particular rotation and translation of the link 320. For this, the outer surface 341 is shaped corresponding to the shape of an arching surface 331 of the housing 301. The arching surface 331 is configured to guide the displacement of the link 320 from the start position 291 to the stop position. For this, the arching surface 331 is in contact with the curved outer surface 341 of the link 320.

Illustrated in FIG. 6 is also a further surface 332 of the housing 301. The further surface 332 is in contact with a further curved outer surface 342 of the link 320. The surface 341 and the surface 342 are on opposite sides of the link 320. Also the surfaces 332, 342 guide the displacement of the link 320.

The link 320 includes an input port 323. The input port 323 is configured to receive an input force 269 which equals the force 259 provided by the motorized actuator 201. For this, the input port 323 is connected with the cable 223 leading towards the motorized actuator 201 (the motorized actuator 201 is not illustrated in FIG. 6). For example, a connection providing a degree of freedom relating to rotation of the respective end of the cable 223 with respect to the input port 323 may be employed.

The link 320 further includes an output port 321. The output port 321 is configured to provide an output force 261 based on the input force 269. The output port 321 is connected with the cable 221 leading towards the load 211, e.g., by crimping or pressure fit or adhesive connection. Thus, the output force 261 has to counteract the resistance 251 imposed by the load 211. Thus, the output port 321 is connected to the load 211 via the cable 221. For example, a connection providing a degree of freedom relating to rotation of the respective end of the cable 221 with respect to the output port 321 may be employed.

The link 320 further includes an output port 322. The output port 322 is configured to provide an output force 262 based on the input force 269. The output port 322 is connected with the cable 222 leading towards the load 212. Thus, the output force 262 has to counteract the resistance 252 imposed by the load 211. Thus, the output port 322 is connected to the load 212 via the cable 222. For example, a connection providing a degree of freedom relating to rotation of the respective end of the cable 222 with respect to the output port 322 may be employed.

The ports 321-323 are arranged at fixed distances with respect to each other. The ports 321-323 are rigidly connected to the link 320, i.e., are fixedly located in the reference coordinate system of the link 320.

Now referring to FIGS. 6-9, the dynamics of the displacement of the link 320 are described. The dynamics of the link 320 is caused by a stroke of the cable 223 provided by the motorized actuator 201. The dynamics of the link 320 causes a stroke of the cables 221, 222. Thus, the link 320 mediates actuation of the loads 211, 212.

The arching surface 331 guides a rotation of the link 320 which is triggered by the stroke of the cable 223, i.e., by the input force 269. The arching surface 331 and the cavity 302 define a rotational axis 93 of this rotation of the link 320. The rotational axis 93 is oriented perpendicular to the drawing plane of FIGS. 6-9. The rotational axis 93 is oriented perpendicular to, both, directions of the movement, i.e., perpendicular to, both, the x-axis 91, as well as the y-axis 92 (the x-axis 91 is defined in parallel to the orientation of the input force 269).

The link 320 is configured to rotatably displace/swivel between the start position 291 and the stop position 294 (cf. FIG. 9), in the example of FIGS. 6-9 by a rotation of 90°. Generally, a smaller or larger rotation would be possible, e.g., a rotation not smaller than 45° or a rotation not smaller than 80°. Hence, the rotation may be in the range of 45°-135°, optionally in the range 80°-100°. Specifically, it has been found that a rotation in the range of 80°-100° has the following advantageous effect. On one side, the rotational contribution to the displacement of the link 320 is comparably large; on the other side, excessive rotation—which may lead to jamming of the link 320 in the stop position 294—is avoided. Hence, the rotation in the range of 80°-100° helps to tailor the trade-off between (i) maximized load sequencing and load limiting; and (ii) reliable kinematics of the link 320 without jamming can be achieved.

As can be seen, upon applying the input force 269, the link 320 generally translates along the x-axis 91. The link 320 further rotates within the plane of the x-axis 91 and the y-axis 92. The displacement of the link 320 thus includes a superposition of a translation and a rotation.

Figure 7:
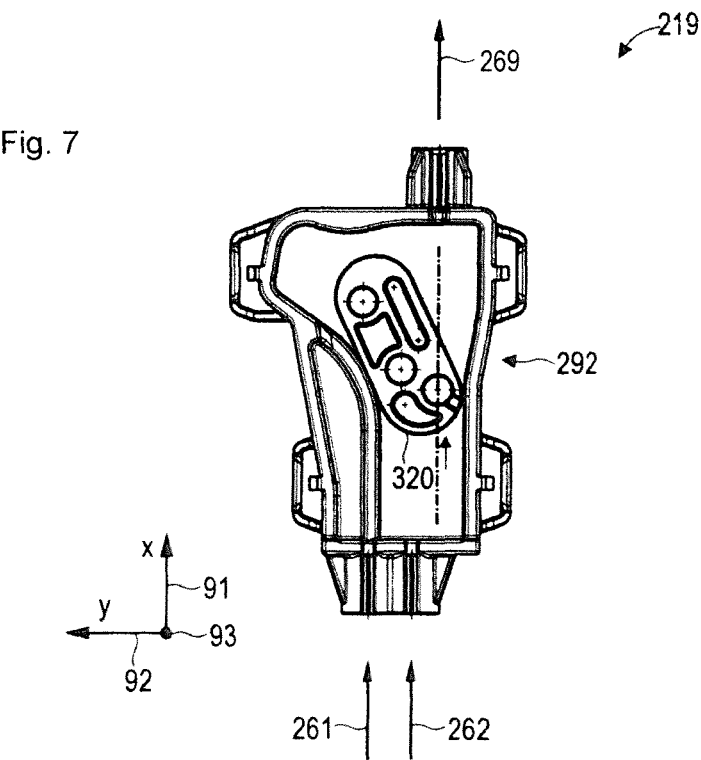
FIG. 7 is a top view of the device according to the example of FIG. 6, wherein the link is in an intermediate position in FIG. 7.
Figure 8:
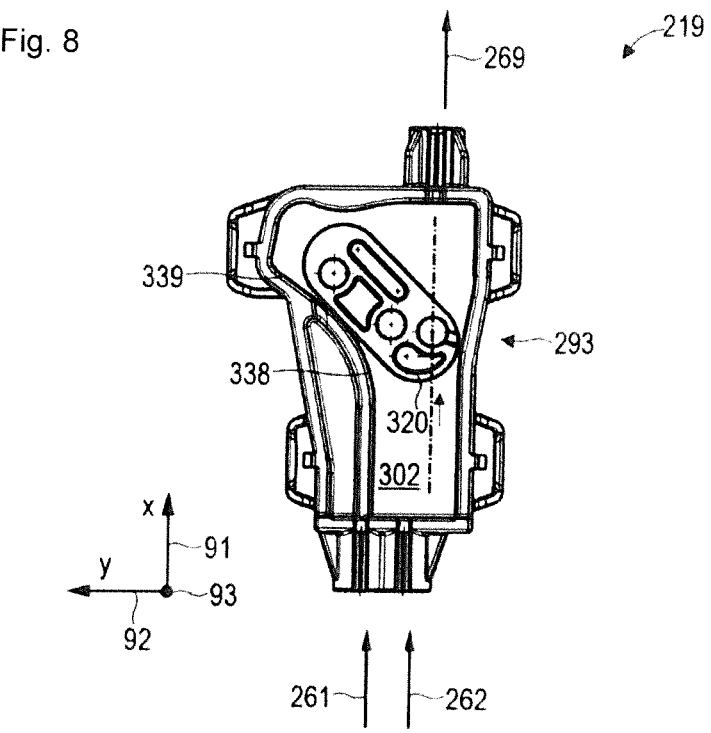
FIG. 8 is a top view of the device according to the example of FIG. 6, wherein the link is in an intermediate position in FIG. 8.
Figure 9:
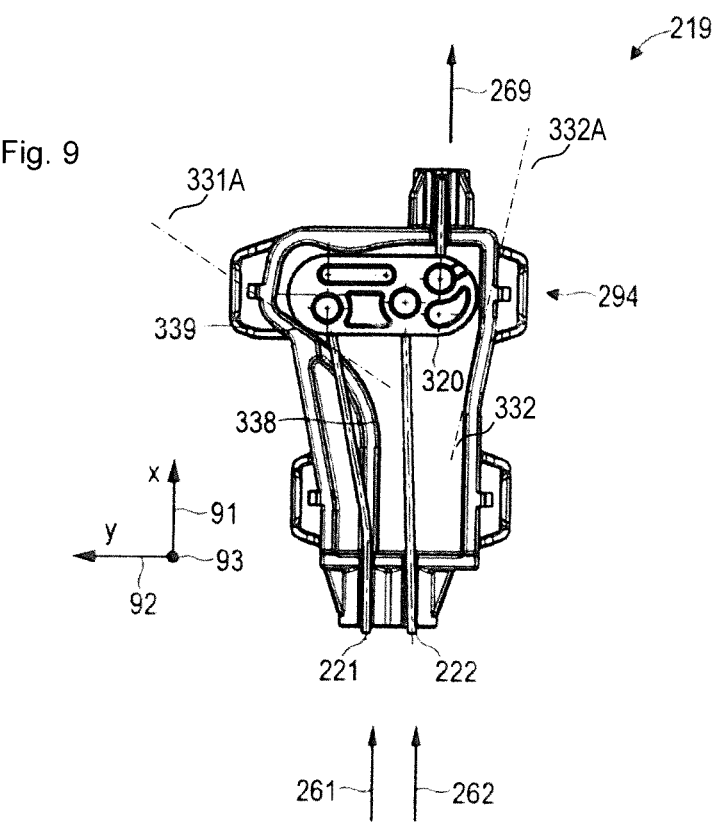
FIG. 9 is a top view of the device according to the example of FIG. 6, wherein the link is in a stop position in FIG. 9.

The center of rotation 94 is illustrated in the inset of FIG. 6. The center of self-rotation 94 corresponds to the input port 323 in this example: This is because the input port is only moved along the x-axis 91, cf. dashed-dotted lines in FIGS. 7 and 8. FIGS. 7 and 8 illustrate intermediate positions 292, 293 of the displacement of the link 320, whereas FIG. 9 illustrates the stop position 294. In other words: the input port 323 does not move along the y-axis 92. Thus, the link 320 can be said to rotate around the center of rotation 94 corresponding, in the illustrated example, to the input port 323.

The rotational and translational displacement of the link 320 causes movement of the ports 321-322 along the x-axis 91 and the y-axis 92, respectively. In particular, different strokes can be provided to the loads 211, 212 by appropriately configuring the displacement of the link 320. This facilitates sequenced actuation of the loads 111, 112 or load limiting.

Figure 10:
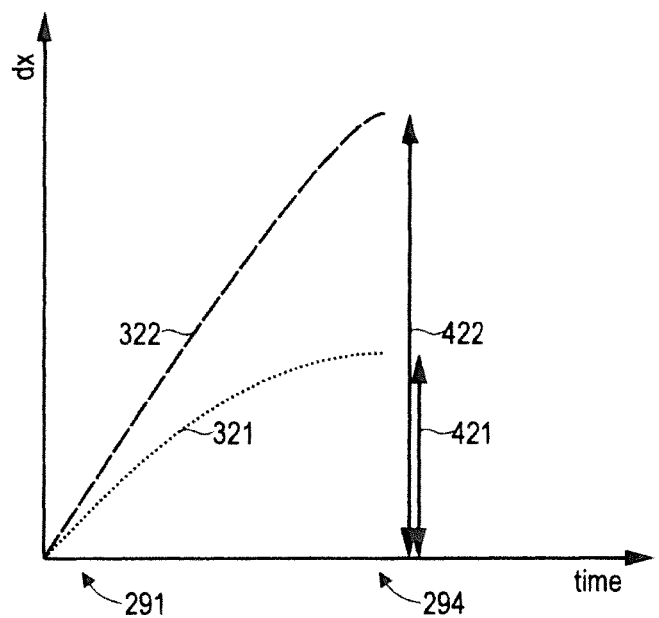
FIG. 10 schematically illustrates the trajectory of the movement of ports of the link of the device of FIG. 6 in time-domain due to the displacement of the link from the start position to the stop position according to various examples.
Figure 11:
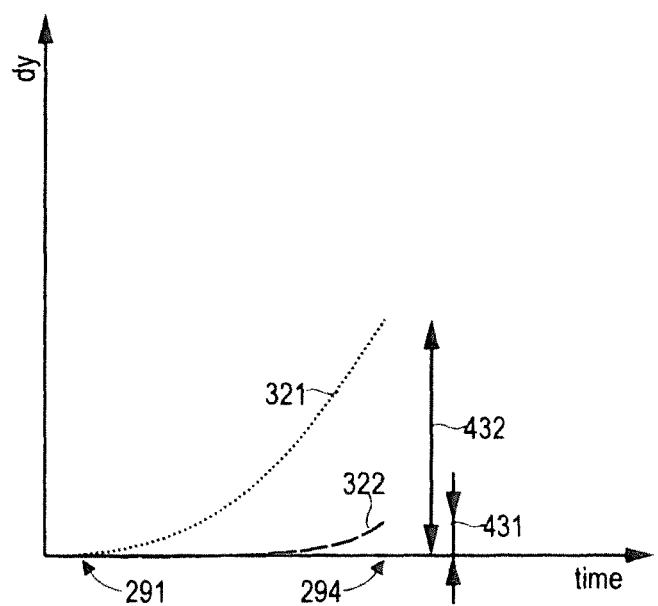
FIG. 11 schematically illustrates the trajectory of the movement of ports of the link of the device of FIG. 6 in time-domain due to the displacement of the link from the start position to the stop position according to various examples.

FIGS. 10 and 11 illustrate movement of the ports 321, 322 along the x-axis 91 (cf. FIG. 10) and the y-axis 92 (cf. FIG. 11), respectively. From FIG. 10 it is apparent that the distance 421 by which the port 321 is moved along the x-axis 91 is smaller than the distance 422 by which the port 322 is moved along the x-axis 91. In the example, the distance 421 is less than 50% if compared to the distance 422. Generally, the distance 421 may not be larger than 80% of the distance 422, optionally not larger than 50%, for optionally not larger than 20%.

In the examples of FIGS. 6-9, the distance 422 equals 26.5 mm and the distance 421 equals 14 mm; this is an example configuration only and different distances 421, 422 can be achieved by different designs of the arching surface 331 and the eccentricities of the output ports 321, 322.

On the other hand, from FIG. 11, it is apparent that the distance 431 by which the port 321 is moved along the y-axis 92—i.e., perpendicular to the direction along which the motorized actuator provides the input force 269—is larger than the distance 432 by which the port 322 is moved along the y-axis 92.

By the differences between these distances 421, 422, 431, 432, it is possible to provide different strokes to the cables 321, 322, i.e., different strokes for actuation of the loads 211, 212.

The differences between these distances 421, 422, 431, 432 are caused by the different curvatures of the curves in FIGS. 10 and 11. The curvatures of the curves in FIGS. 10 and 11 are caused by the rotation of the link 320. The curvature of the curves in FIGS. 10 and 11 is at least partly defined by the curvature of the arching surface 331. The curvature of the curves in FIGS. 10 and 11 is further at least partly defined by a distance between the respective output ports 321, 322 from the center of self-rotation 94, i.e., the input port 323 in the illustrated examples. Thus, the difference between the distances 421 and 422, as well as the difference between the distances 431 and 432 is achieved by the distanced arrangement of the output ports 321 and 322 with respect to each other on the link 320. In particular, the output port 321 is arranged at a larger distance along the x-axis 91 in the start position 291 from the input port 323 if compared to the distance along the x-axis 91 and in the start position 291 between the output port 322 and the input port 323. The results in the different distances 421, 422, 431, 432, because the output port 321 is affected earlier by the rotation of the link 320 about the center of self-rotation 94 than the output port 322 when displacing from the start position 291 to the stop position 294. More generally, the ports 321, 322 may be arranged at different fixed distances with respect to the center of self-rotation 94 of the link 320. Therefore, the same rotation—of, e.g., 90° in the scenario of FIGS. 6-9—results in a different movement of the ports 321, 322 along the x-axis 91 and the y-axis 92.

For example, the output port 321 is arranged adjacent to the arching surface 331 and in between the arching surface 331 and the input port 323 in the start position. In particular, the output port 321 is offset along the y-axis 92 from the input port 323. Thereby, a torque is applied to the link 320 due to the resistance 251 counteracting the output force 261 in response to providing the input force 269. This facilitates the rotation of the link 320 about the rotational axis 93.

In the example of FIGS. 6-9, also the output port 322 is offset from the input port 323 along the y-axis 92. However, this offset is optional. In the example of FIGS. 6-9, the output port 322 is arranged in between the output port 321 and the input port 323. In other words, the output port 322 is arranged close to the center of rotation 94, in particular closer than the output port 321. Thus, the movement of the output port 321 is affected more strongly by the rotational component of the displacement of the link 320 if compared to the movement of the output port 322 (cf. stronger deviation of the shape of the curve 321 from linear in FIG. 10, if compared to curve 322). Thus, the port 321 is arranged with a comparably large eccentricity with respect to the center of rotation 94. This causes the comparably small movement 432 of the output port 322 along the y-axis 92—and a large effective stroke.

The arching surface 331 includes a section 338 and a further section 339. The section 338 is in contact with the surface 341 of the link 320 in the start position 291 while the section 339 is in contact with the surface 341 of the link 320 in the stop position 294. As will be appreciated from FIGS. 6-9, the section 339 has a larger component which is aligned in parallel with the y-axis 92; while, in fact, in the examples of FIGS. 6-9, the section 338 does not extend at all along the y-axis 92, but only along the x-axis 91. Hence, the section 339 extends partially along the y-axis 92.

Due to this configuration of the arching surface 331, the counterforce associated with the output force 261 and provided by the load 211 is absorbed to a larger degree the more the link 320 has rotated about the rotational axis 93, respectively the more the link 320 has displaced from the start position 291 towards the stop position 294. In other words, in the stop position 294, the load 211 may be effectively decoupled from the motorized actuator 201, e.g., if the arching surface 331 is fully parallel to the y-axis 92. The load 211 may also be partly decoupled from the motorized actuator 201, e.g., if the arching surface 331 is partly parallel to the y-axis 92. Then, the resistance 251 imposed by the load 211 to the input force 269, i.e., to the force output by the motorized actuator 201, decreases. Then, the motorized actuator 201 has to provide a smaller force 259 and the input force 269 decreases accordingly (cf. falling edge 298 in FIG. 5). This facilitates load limiting. Furthermore, this may facilitate sequencing of the actuation of the loads 211, 212.

By means of the difference in the distances 421, 422, it is possible to implement actuation of the loads 211, 212 using different strokes. In particular, the load 212 is actuated using a larger stroke than the stroke used for actuating the load 211. This can be used to facilitate the sequencing of the resistances 251, 252 imposed by the loads 211, 212 (cf. FIG. 5): For example, the load 212 can be configured to provide the resistance 252 which varies with the movement of the link 320 along the x-axis 91 from the start position 291 to the stop position 294. For example, the load 212 may be configured to provide the resistance 252 which increases with progressing movement along the x-axis 91 from the start position 291 to the stop position 294. A step-wise profile is possible (cf. FIG. 5, where the step 299 is illustrated). Then, the resistance 252 may be small initially— while the resistance 251 to the input force 269 is large—and may be large subsequently—while the resistance 251 to the input force is small.

Hence, as will be appreciated, two effects may contribute to the sequencing of the resistances 251, 252: (I) The falling edge 298 of the resistance 251 opposing the input force 269 is achieved by the rotation of the link 320 about the rotational axis 93. Here, resistance 259 is effectively reduced, because at least a fraction of the corresponding output force 261 is absorbed or provided by the arching surface 331 when the link 320 rotatably displaces towards the stop position 294. (II) Differently, the postponed rising edge 299 of the resistance 252 opposing the input force 269 is achieved by an appropriate configuration of the load 212. Here, the load 212 can be configured to provide the rising edge 299 of the resistance 252 only for increased strokes, i.e., only for progressing movement of the output port 322 along the x-axis 91. There are different scenarios conceivable to implement such a stroke-dependent resistance 252. One example is illustrated in FIG. 12.

Figure 12:
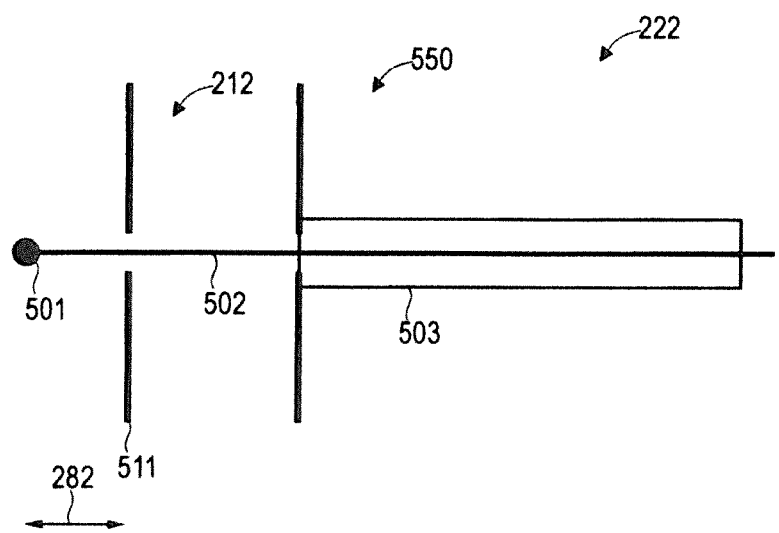
FIG. 12 schematically illustrates a Bowden cable being connected to a respective load by a loose fit to provide a stroke-dependent step-wise resistance according to various examples.

FIG. 12 illustrates aspects with respect to load sequencing. In particular, FIG. 12 illustrates aspects with respect to the Bowden cable 222 used to actuate the load 212. The Bowden cable 222 has a first end attached to the output port 322 and further has an opposing second end 550. The opposing second end 550 in connected to the load 212 by a loose fit. The loose fit is configured to provide the resistance 252 which varies with said movement of the output port 322 along the x-axis 91. The loose fit is implemented by the distance 282 between a nipple 501 of the inner wire 502 of the Bowden cable and a fixed stop 511 of the load 212 to engage with the nipple once the nipple has traveled by the distance 282. For example, the fixed stop 511 can implement a part of an actuation member such as a locking mechanism or a displacement mechanism.

Such techniques as described in connection with FIG. 12 are not required if mere load limiting functionality is desired, but no load sequencing.

Figure 13:
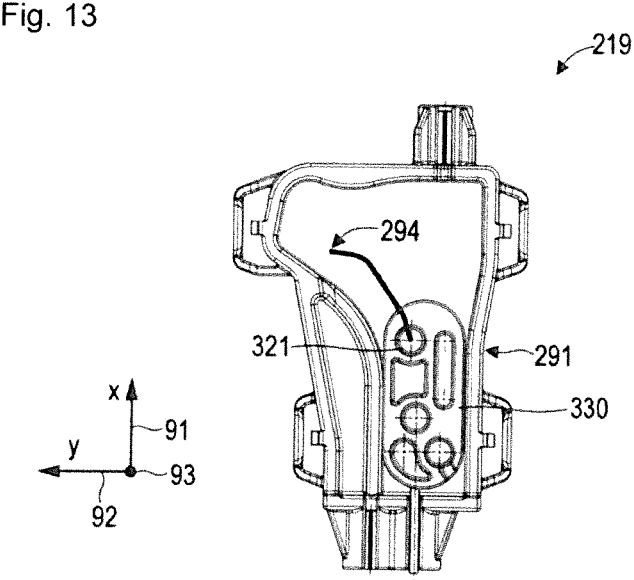
FIG. 13 schematically illustrates the trajectory of one of the ports of the link of the device of FIG. 6 due to the displacement of the link from the start position to the stop position according to various examples.

FIG. 13 is a top view of the device 219 according to the examples of FIGS. 6-9. FIG. 13 illustrates the trajectory of output port 321 in the xy-plane due to displacement 291 of the link 330 from the start position 291 to the stop position 294 (thick full line in FIG. 13).

From FIG. 13 it is apparent that the output port 321 shows a significant movement along the y-axis 92. The movement along the x-axis 91, on the other hand, is limited. This facilitates for the load-dependent stroke.

Figure 14A:
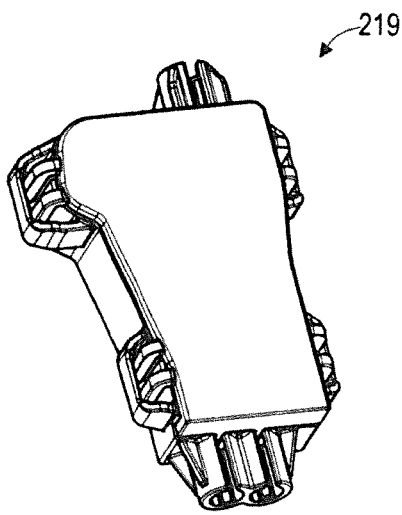
FIG. 14A is a perspective view of the device of FIG. 6 according to various examples.
Figure 14B:
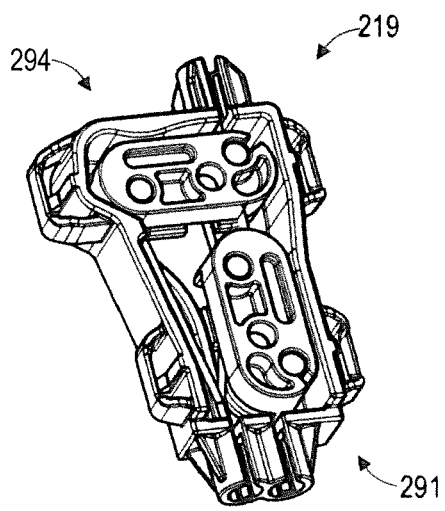
FIG. 14B is a perspective view of the device of FIG. 6 according to various examples.

FIGS. 14A and 14B are perspective views of the device 219 according to the examples of FIGS. 6-9. FIG. 14A illustrates the device 219 with a closed lid of the housing 301 sealing the cavity 302. In FIG. 14B, the lid is not shown. FIG. 14B illustrates the link 320 in, both, the start position 291, as well as the stop position 294 for illustrative purposes.

Figure 15:
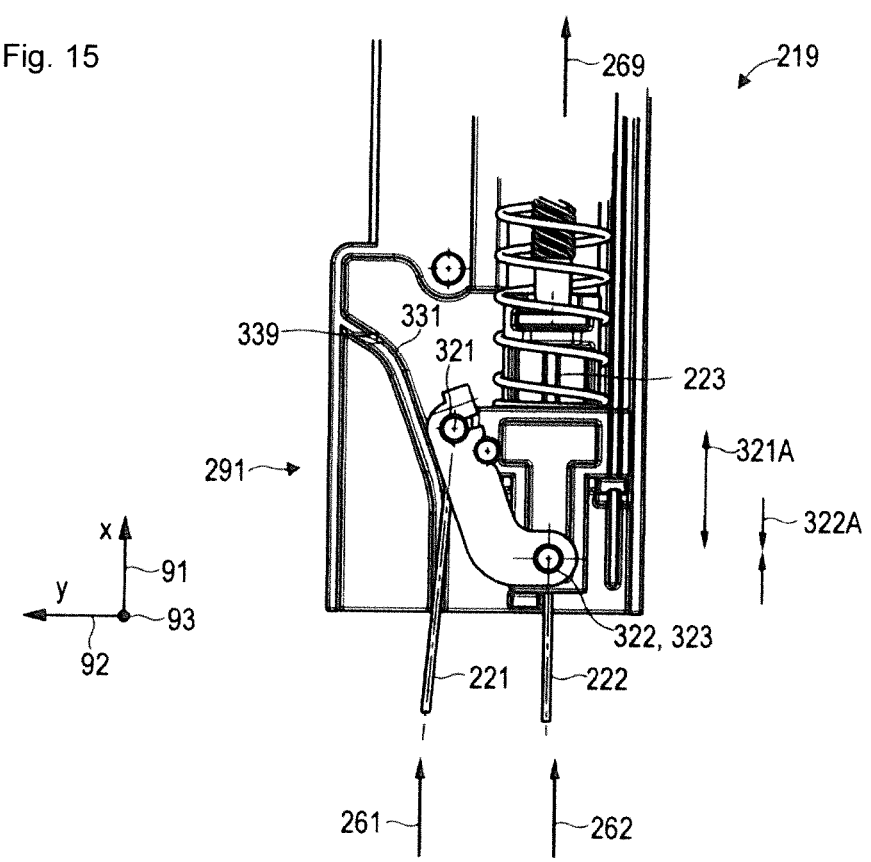
FIG. 15 is a top view of a device according to various examples, wherein the device includes a link, wherein the link is in a start position in FIG. 15.
Figure 16:
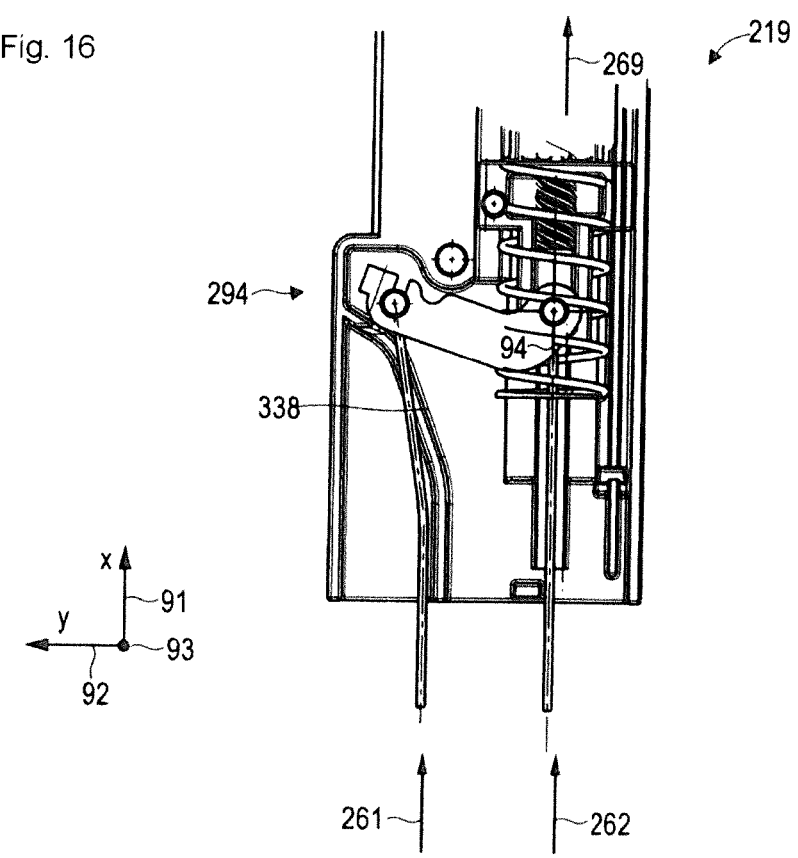
FIG. 16 is a top view of the device according to the example of FIG. 15, wherein the link is in a stop position in FIG. 16.

FIGS. 15 and 16 are top views of a further example implementation of the device 219. In the example of FIGS. 15 and 16, the device 219 is integrated within the motorized actuator 201 such that the input force 269 is provided via a fixed shaft 223. Furthermore, in the example of FIG. 15, the input port 323 and the output port 322 are co-located, i.e., the distance 322A is zero. The distance 321A between the output port 322 and the output port 321 in the star position 291 and along the x-axis 91 is also indicated and is larger than zero. In the example of FIGS. 15 and 16, the arching surface 331 includes a stepwise profile between the sections 338, 339.

Figure 17:
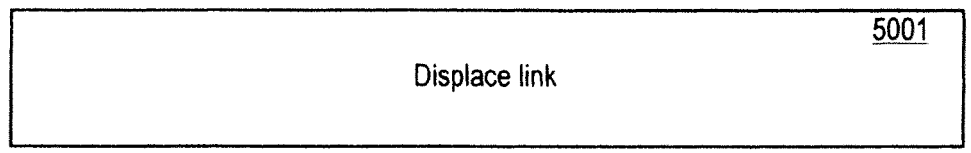
FIG. 17 is a flowchart of a method according to various examples.

FIG. 17 is a flowchart of a method according to various examples. In 5001, a link is displaced. Said displacement may have include a rotation and a translation. The displacement may cause movement of various ports of the link, e.g., of an input port, a first output port, and a second output port.

The input port may be configured to receive an input force oriented along a given axis. The output ports may move by different distances along the given axis. Thus, different strokes are implemented for first and second loads connected to the first and second output ports, respectively. Movement along a further axis perpendicular to the given axis is caused by the rotation. This movement does not convey an output force, because it is oriented along a direction orthogonal to the direction of the input force.

Figure 18:
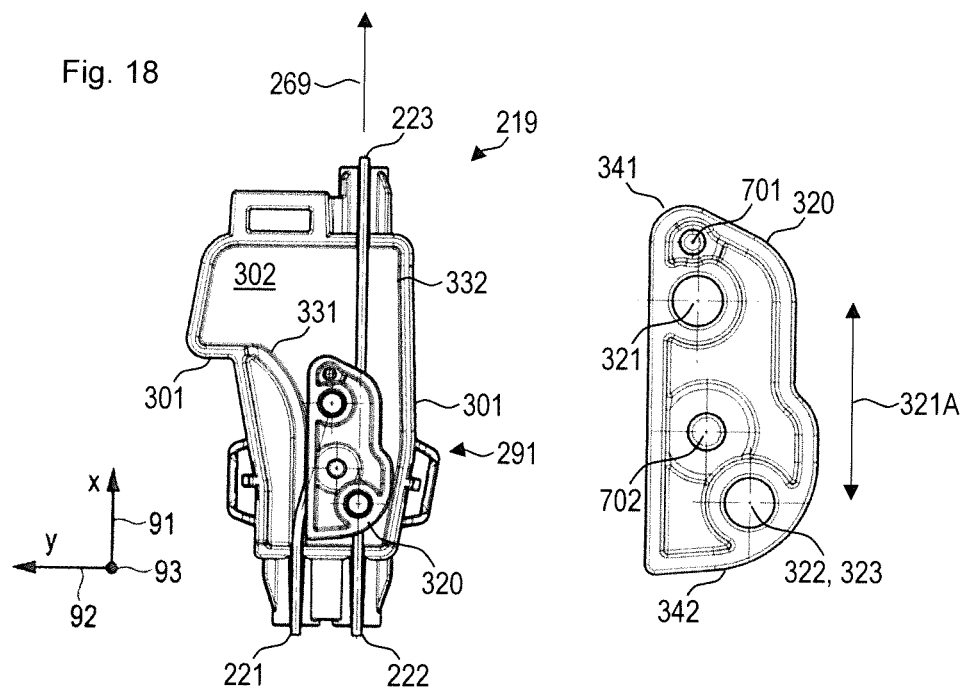
FIG. 18 is a top view of a device according to various examples, wherein the device includes a link, wherein the link is in a start position in FIG. 18.

FIG. 18 illustrates aspects with respect to the device 219. FIG. 18 is a top view of the device 219. The device 219 includes a housing 301. In FIG. 18, the housing 301 is only partially illustrated so as not to obstruct the view of a link 320 which is displaceably arranged within an internal cavity 302 of the housing 301.

The device 219 of the example of FIG. 18 generally corresponds to the device 219 of the example of FIG. 6. In the example of FIG. 18, however, the input port 323 is co-located with the output port 322 (as already explained in connection with FIG. 15). This is particularly visible in the inset of FIG. 18 (marked with the dashed lines).

By co-locating the input port 323 and the output port 322, it is possible to increase and potentially even maximize the distance 422. Hence, the load 212 can be actuated with a large stroke.

Figure 19:
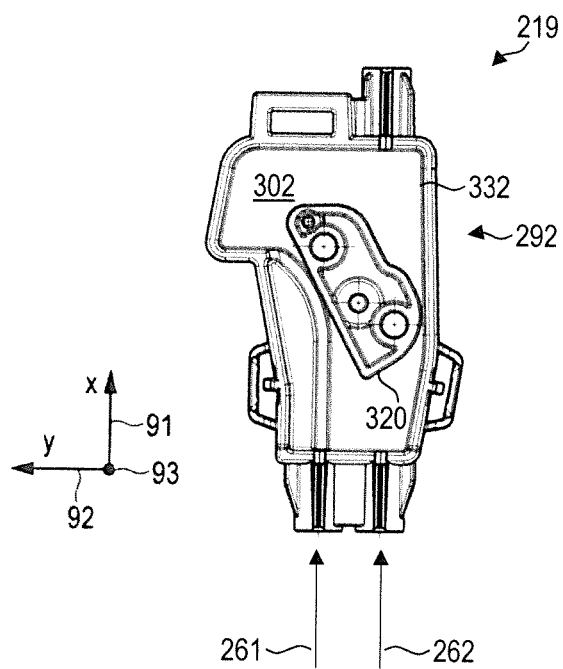
FIG. 19 is a top view of the device according to the example of FIG. 18, wherein the device includes a link, wherein the link is in an intermediate position in FIG. 19.
Figure 20:
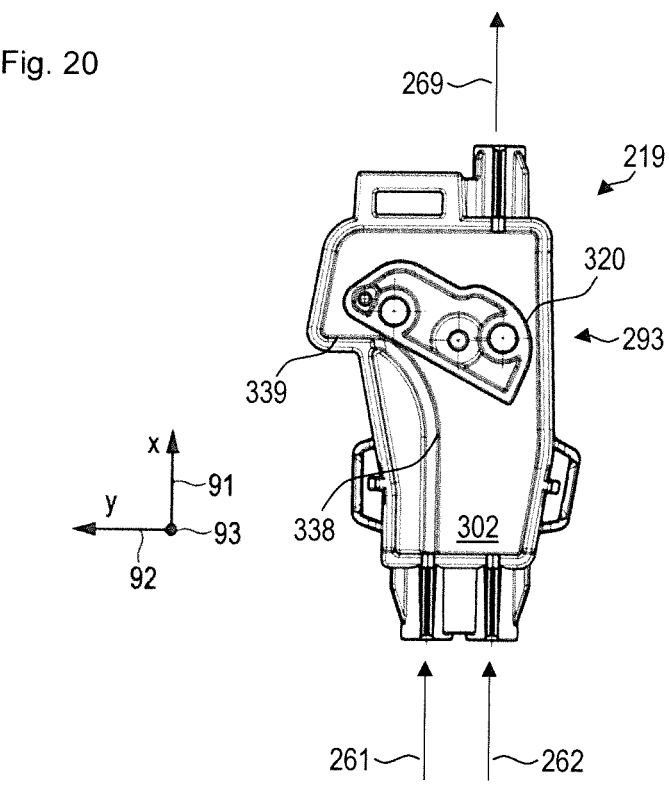
FIG. 20 is a top view of the device according to the example of FIG. 18, wherein the device includes a link, wherein the link is in an intermediate position in FIG. 20.
Figure 21:
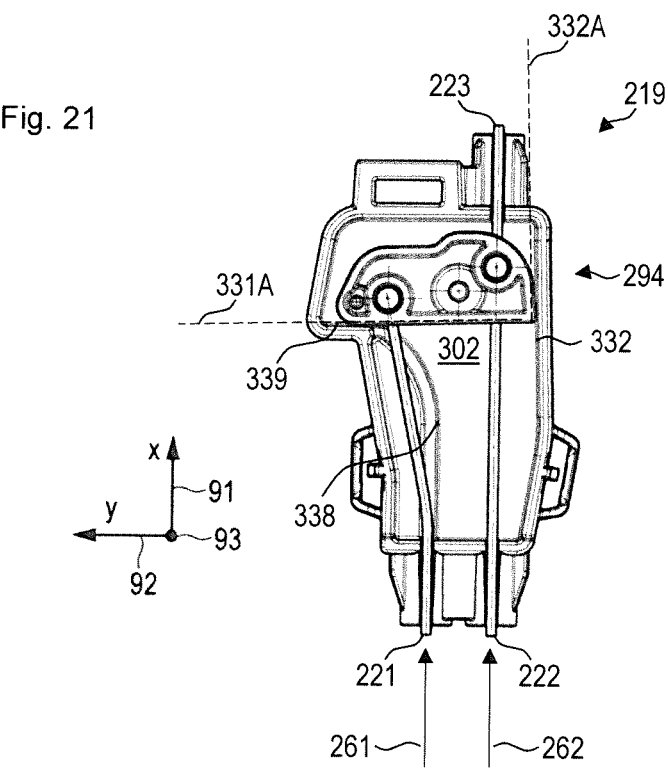
FIG. 21 is a top view of the device according to the example of FIG. 18, wherein the device includes a link, wherein the link is in a stop position in FIG. 21.

Further, by co-locating the input port 323 and the output port 322, it is possible to re-use a single cable for transporting, both, the input force 269, as well as the output force 262. In other words, it is possible that the cable 223 and the cable 222 are integrally formed. Then, only a single connection between that cable 222, 223 and the link 320 is required, e.g., a single act of crimping or pressure fit or adhesive connection. Now referring to FIGS. 19-21, the dynamics of the displacement of the link 320 according to the example of FIG. 18 are described. Here, FIG. 19 generally corresponds to FIG. 7. FIG. 20 generally corresponds to FIG. 8. FIG. 21 generally corresponds to FIG. 9.

The link 320 according to FIGS. 18-21 also illustrates a further feature that helps to facilitate reliable movement of the link 320 between the various positions 291-294. From a comparison of FIGS. 9 and 21, it is apparent that, in FIG. 9, the surface 331 and the surface 332 form a V-shaped groove, i.e., the surface 332 is tilted away from the arching surface 331; while in FIG. 21, the surface 332 is tilted towards the arching surface 331.

By adjusting the tilt angle between the respective surface tangents 331A and 332A (cf. FIGS. 9 and 21) of the surfaces 331, 332, the friction required to be overcome when releasing the link 320 from the stop position 294 towards the start position 291 can be tailored. Depending on the design constraints, this can help to achieve reliable dynamics and low wear-out. For example, there can be a tendency that when using the V-shaped groove design of FIG. 9, the friction required to be overcome to release the link 320 is higher than for the design of FIG. 19. This can lead to jamming of the link 320 in the stop position 294.

The tilt of the tangents 331A and 332A can be implemented separately from the co-location of the input port 323 and the output port 322, even illustration in conjunction in FIG. 18.

In the scenarios of FIGS. 18-21, the section 339 of the surface 331 in contact with the link 320 in the stop position 294 (cf. FIG. 21) is fully aligned with the y-axis 92—which is different, e.g., from the scenario of FIG. 6. Such a configuration helps to provide stability to the link 320 in the stop position 294, while still avoiding jamming of the link 320.

Figure 22:
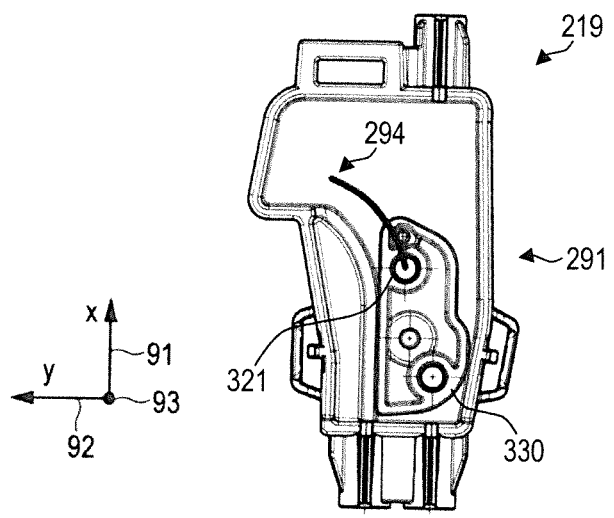
FIG. 22 schematically illustrates the trajectory of one of the ports of the link of the device of FIG. 18 due to the displacement of the link from the start position to the stop position according to various examples.
Figure 23:
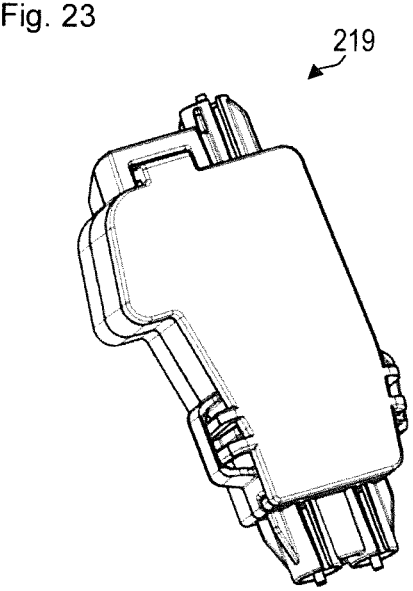
FIG. 23 is a perspective view of the device of FIG. 18 according to various examples.
Figure 24:
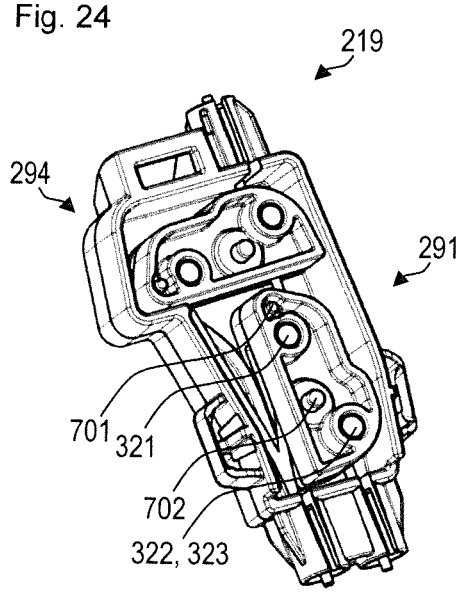
FIG. 24 is a perspective view of the device of FIG. 18 according to various examples.

FIGS. 22-24 illustrate further details with respect to the device 219 of FIGS. 18-21. Here, FIG. 22 generally corresponds to FIG. 13; FIG. 23 generally corresponds to FIG. 14A; and FIG. 24 generally corresponds to FIG. 14B. In FIG. 24, a lower part 320-2 of the link 320 is illustrated; a scenario in which the link 320 is made from two parts, the lower part 320-2 and an upper part (not illustrated in FIG. 24) is generally optional. Details of such a two-part implementation of the link 320 are also illustrated in FIG. 25.

Figure 25:
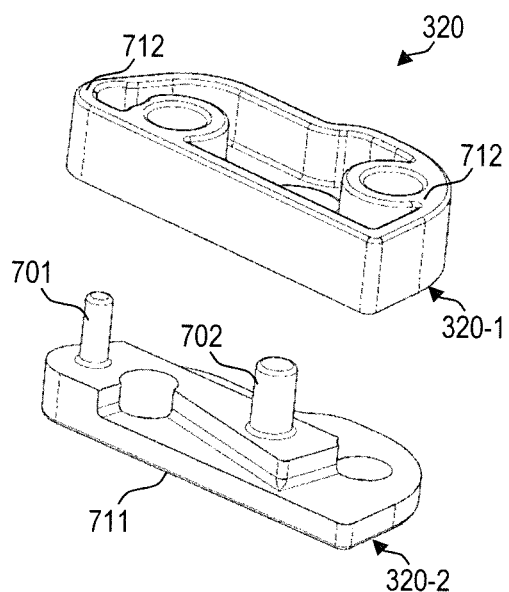
FIG. 25 schematically illustrated a two-part link according to various examples, wherein an upper part and a lower part of the link are disengaged.

FIG. 25 illustrates aspects with respect to the link 320. In particular, FIG. 25 illustrates an implementation of the link 320 including two parts, i.e., an upper part 320-1 and a lower part 320-2. Both parts 320-1, 320-2 extend in the xy-plane.

The upper part 320-1 includes an upper surface 711 configured to slide along a respective inter-related sliding surface of the housing 302; the lower part 320-2 includes a lower surface 711 configured to slide along a respective inter-related sliding surface of the housing 302. The sliding surfaces (not illustrated in FIG. 25) defined the upper and lower boundaries of the cavity 302. To facilitate sliding, the surfaces 711, 712 and the sliding surfaces are preferably flat.

In the example of FIG. 25, the outer contours of the parts 320-1, 320-2 in the xy-plane are the same.

Figure 26:
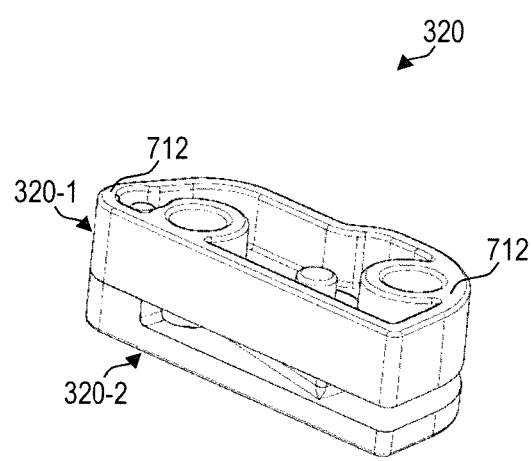
FIG. 26 schematically illustrated a two-part link according to various examples, wherein an upper part and a lower part of the link are engaged with each other.
Figure 27:
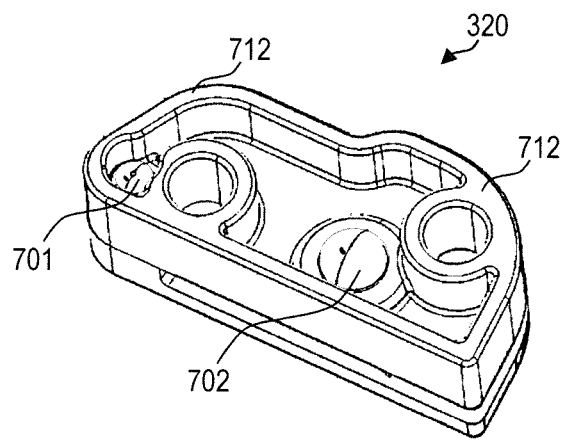
FIG. 27 schematically illustrated a two-part link according to various examples.
Figure 28:
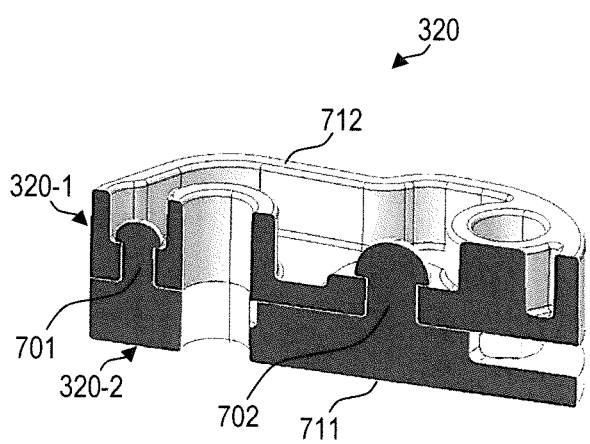
FIG. 28 schematically illustrated a two-part link according to various examples.

To facilitate the connection of the various cables 221-223, it is possible that the two parts 320-1, 320-2 are joined together/engaged with each other (cf. FIG. 26) and, by engaging the parts, the cables 221-223 are fastened at the ports 321-323 to the link 320. As illustrated in FIG. 25, both parts 320-1, 320-2 include inter-related engagement features 701, 702 (also cf. inset of FIG. 18 and FIG. 24). In the illustrated examples, the engagement features 701, 702 are configured for a clip connection (cf. FIG. 28) and a screw fitting (cf. FIG. 27). FIG. 28 implements, in particular, a barbed hook clip connection.

Figure 29:
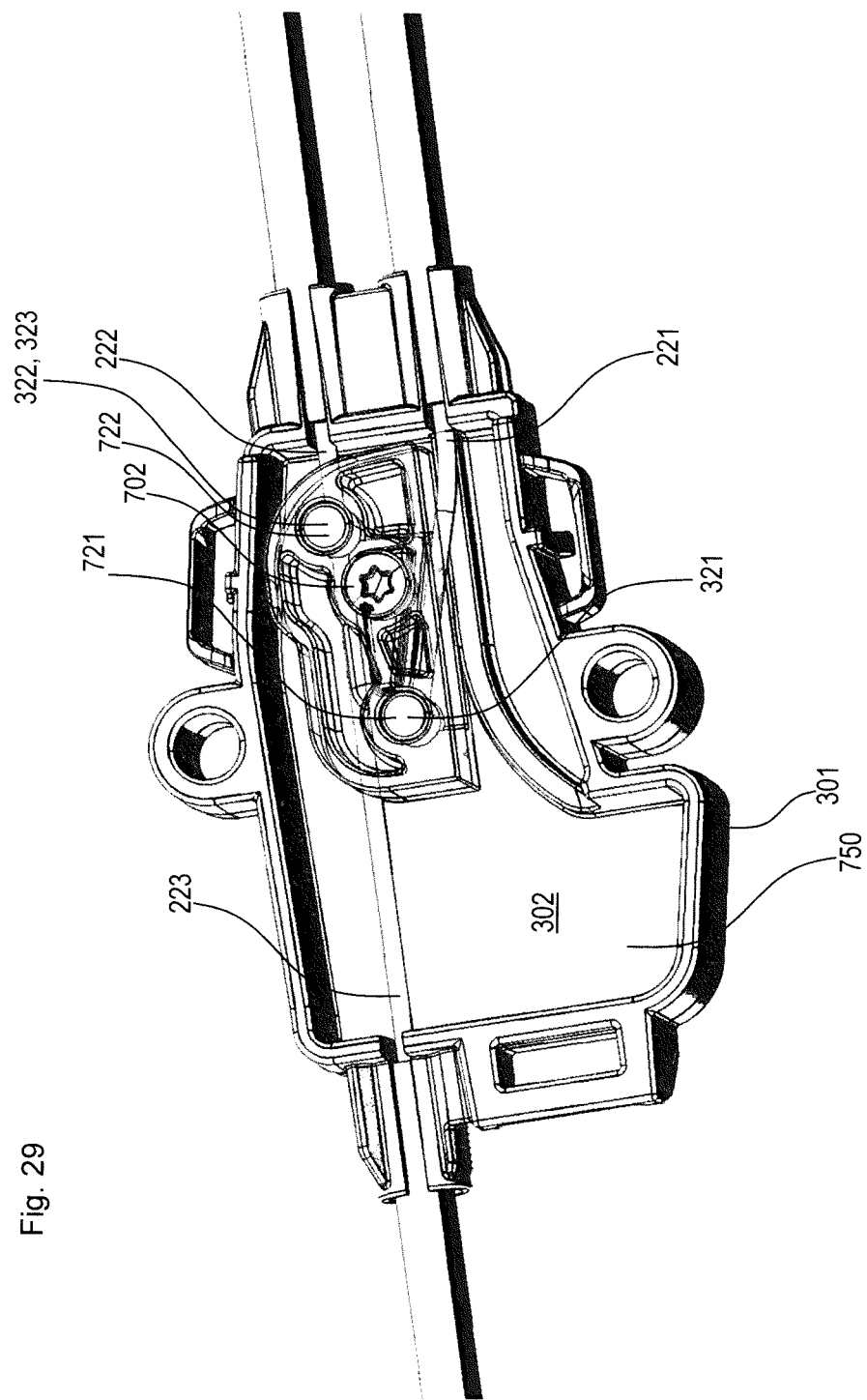
FIG. 29 schematically illustrated a two-part link according to various examples.

For example, both parts 320-1, 320-2 may include recesses that facilitate attachment of fixation means to attach the cables 321-323, e.g., for screws, crimps, etc. The connection to the cables 321-323 is illustrated in FIG. 29. In FIG. 29, the end caps 721, 722 of the Bowden cables are arranged in recesses—implementing the ports 321-323—formed in the parts 320-1, 320-2 and fastened to the link 320. Then, it would be possible to fixate the cables 221-223 by joining together the two parts 320-1, 320-2, e.g., using a pressure fit, at the ports 321-323. Thus, first the cables 221-223 are inserted, e.g., into the respective recesses of the lower part 320-1; then the upper part 320-2 is engaged with the lower part, with the cables 221-223 already attached to the lower part 320-2. This fastens the cables 221-223 to the ports 321-323. The ports 321-323, in a state in which the parts 320-1, 320-2 are joined together, can define cavities enclosing the end caps of the Bowden cables.

FIG. 29 also illustrated the lower sliding surface 750 of the housing 301.

While in FIG. 25 a scenario is illustrated in which the two-part link 320 is implemented for co-located ports 322, 323, similar techniques may be readily applied for a scenario in which the ports 322, 323 are not co-located. Where the co-located ports 322, 323 are used, a two-part link 320 as illustrated in FIG. 25 further facilitates the ease of assembly, specifically in view of the possibility to have the cables 222, 223 integrally formed.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, while various examples have been described with respect to loads associated with a backrest and a headrest of a seat, these techniques are not restricted to such applications. Application of the techniques described herein to other types of loads are possible.

For further illustration, above various examples have been described with respect to actuating locking mechanisms, i.e., unlocking locking mechanisms. In other examples, it would be possible to implement different kinds and types of actuation mechanisms.

For further illustration, above techniques have been described with respect to actuating actuation mechanisms which are associated with two separate displaceable parts, e.g., a headrest and a backrest, i.e., different parts which perform different displacements in response to said actuating (cf. FIG. 1). These displacements may be enabled by actuation of a locking mechanism; the energy for performing the displacement may or may not be provided by the motorized actuator. In some examples, separate energy-storage means such as springs etc. may be employed for said displacing. In some examples, it would be possible that multiple load-implementing actuation mechanisms of a single displaceable part are actuated. Then, the single displaceable part can displace in response to actuation of the actuation mechanisms, e.g., again powered by the motorized actuator and/or separate energy storage means. I.e., a single displacement action may be triggered by—e.g., sequentially—actuating the two loads. For example, it would be possible to actuate two actuation mechanisms which result in a common displacement of a load. For example, a headrest may be provided with two locking mechanism, e.g., associated with different linear support members. Then, only once the two locking mechanisms have both been sequentially actuated, i.e., unlocked, the headrest may displace. Also in such a scenario, the load sequencing as described herein may help to reduce the maximum force that is required to be provided by the motorized actuator. While only a single displacement may be resulting from multiple actuations, it is still possible to trigger the displacing with low latency if the load sequencing is implemented on a short timescale, e.g., seconds.

For further illustration, various examples have been described where an arching surface of the housing of the device is provided to guide the displacement of the link. In other examples, the arching surface may be provided by the link, e.g., as a guide slot through which a rod of the housing extends through.

For further illustration, various examples have been described which illustrate displacement of the link from the start position to the stop position. However, the displacement of the link can be reversible. The link may displace from the stop position to the start position, e.g., in a reciprocal manner if compared to the displacement from the start position to the stop position.

For still further illustration, various examples have been described in which actuation of the loads is sequenced in time-domain, i.e., load sequencing. Here, the rising edges of the resistances of two loads are offset in time-domain (cf. FIG. 5). However, in other examples, it may be possible that the rising edges of the resistances of the two loads are not offset in time-domain, but at least partially overlapping in time-domain. Here, a load-limiting functionality may be implemented, because the output force provided to one of the two loads is limited by the rotation of the link. This also limits the input force required to be provided by a motorized actuator. Further, the time-integrated output forces provided by the motorized actuator to the two loads over the course of actuation may differ from each other, e.g., due to the different strokes. This also effectively limits the maximum force and the time-integrated force required to be provided by the motorized actuator.

For still further illustration, various examples have been described in which load limiting and/or load sequencing is employed. In some examples, the techniques described herein may be useful for any actuation of two loads that require two different strokes. In other words, it may not be required to limit the load imposed on the motorized actuator, e.g., by sequencing as described herein. Advantageous effects may already be obtained in connection with actuating different loads with different stroke

The invention claimed is:

1. A device, comprising:
   a housing; and
   a link displaceably arranged in the housing and having an input port configured to receive an input force oriented along a first axis, a first output port configured to provide a first output force based on the input force, and a second output port configured to provide a second output force based on the input force,
   wherein the link is configured to move the first output port from a start position to a stop position along the first axis by a first distance in response to receiving the input force and to move the second output port from the start position to the stop position along the first axis by a second distance in response to receiving the input force, and
   wherein the first distance is smaller than the second distance.

2. The device of claim 1,
   wherein the link is configured to move the first output port from the start position to the stop position along a second axis which is orthogonal to the first axis by a third distance in response to receiving the input force and to move the second output port from the start position to the stop position along the second axis by a fourth distance in response to receiving the input force, and
   wherein the third distance is larger than the fourth distance.

3. The device of claim 2,
   wherein the device comprises an arching surface configured to guide displacement of the link between the start position and the stop position,
   wherein the arching surface defines a rotational axis of the movement of the link, and
   wherein the rotational axis is oriented orthogonal to the first axis and the second axis.

4. The device of claim 1, further including an arching surface configured to guide displacement of the link between the start position and the stop position.

5. The device of claim 4,
   wherein the arching surface is part of the housing and has a first section configured to be in contact with the link in the start position,
   wherein the arching surface has a second section different from the first section and configured to be in contact with the link in the stop position,
   wherein the first section extends at least partially along the first axis, and
   wherein the second section extends at least partially along a second axis which is orthogonal to the first axis.

6. The device of claim 5,
   wherein the arching surface is configured to be in contact with the link at a first outer surface of the link,
   wherein the housing comprises a further surface configured to be in contact with a second outer surface of the link, and
   wherein the first curved outer surface and the second curved outer surface are on opposite sides of the link.

7. The device of claim 6, wherein the further surface is tilted towards the arching surface.

8. The device of claim 6, wherein the arching surface and the further surface form a V-shaped groove.

9. The device of claim 4,
   wherein the arching surface is part of the housing, and
   wherein the first output port is arranged in-between the arching surface and the input port in the start position.

10. The device of claim 1, wherein at least one of the first output port and the second output port is offset from the input port along a second axis which is orthogonal to the first axis.

11. The device of claim 1, wherein the input port is co-located with the second output port.

12. The device of claim 1, wherein a distance between the first output port and the input port along the first axis and in the start position is larger than a distance between the second output port and the input port along the first axis and in the start position.

13. The device of claim 1, wherein the link is configured to rotatably displace between the start position and the stop position.

14. The device of claim 13, wherein the link is configured to rotatably displace between the start position and the stop position by a rotation with respect to a rotational axis of at least 45 degrees.

15. The device of claim 13, wherein the link is configured to rotatably displace between the start position and the stop position by a rotation with respect to a rotational axis of at least 80 degrees.

16. The device of claim 1, wherein the first distance is not greater than 80% of the second distance.

17. The device of claim 1, wherein the first distance is not greater than 50% of the second distance.

18. The device of claim 1, wherein the first distance is not greater than 20% of the second distance.

19. The device of claim 1,
wherein the link comprises a first part and a second part, and
wherein the first part and the second part are configured to engage with each other to thereby fasten cables connected to the first output port, the second output port, and the input port.

20. The device of claim 19,
wherein the first part of the link comprises a lower surface of the link extending in a plane defined by the first axis and a second axis which is orthogonal to the first axis,
wherein the second part of the link comprises an upper surface of the link extending in the plane, and
wherein displacement of the link in the housing comprises sliding of the lower surface and the upper surface along counterpart surfaces of the housing.

21. The device of claims 19, wherein the first part and the second part include inter-related engagement features.

22. A system, comprising:
the device of claim 1;
a first load connected to the first output port; and
a second load connected to the second output port.

23. The system of claim 22, wherein the second load is configured to provide a resistance to the second output force which varies with said movement along the first axis from the start position to the stop position.

24. The system of claim 23, wherein the second load is configured to provide a resistance to the second output force which increases with progressing movement of the second output port along the first axis from the start position to the stop position.

25. The system of claim 23, wherein the second load is configured to provide a resistance to the second output force which increases with progressing movement of the second output port along the first axis from the start position to the stop position in a step-wise manner.

26. The system of claims 23,
wherein the second load is connected to the second output port via a Bowden cable having a first end attached to the second output port and a second end opposite from the first end, and
wherein the second end is connected to the second load by a loose fit configured to provide the resistance to the second output force which varies with said movement of the second output port along the first axis from the start position to the stop position.

27. The system of claim 22, further including
a headrest of a seat, and
a backrest of the seat,
wherein the first load comprises a first actuation mechanism of the headrest, and
wherein the second load comprises a second actuation mechanism of the backrest.

28. The system of claim 22, further including a displaceable part of a seat,
wherein the first load comprises a first actuation mechanism of the displaceable part,
wherein the second load comprises a second actuation mechanism of the displaceable part, and
wherein the displaceable part is configured to displace in response to actuation of, both, the first actuation mechanisms and the second actuation mechanism.

29. A device, comprising:
a housing; and
a link displaceably arranged in the housing and having an input port configured to receive an input force oriented along a first axis, a first output port configured to provide a first output force based on the input force, and a second output port configured to provide a second output force based on the input force,
wherein the link is configured to displace from a start position to a stop position, said displacing comprising a translation and a rotation, and
wherein a distance between the first output port and the input port along the first axis and in the start position is larger than a distance between the second output port and the input port along the first axis and in the start position.

30. A method, comprising:
displacing a link arranged in a housing and having an input port configured to receive an input force oriented along a first axis, a first output port configured to provide a first output force based on the input force, and a second output port configured to provide a second output force based on the input force, thereby moving the first output port from a start position to a stop position along the first axis by a first distance in response to receiving the input force and moving the second output port from the start position to the stop position along the first axis by a second distance in response to receiving the input force,
wherein the first distance is smaller than the second distance.

31. A method, comprising:
translationally and rotationally displacing a link arranged in a housing between a start position to a stop position, the link having an input port configured to receive an input force oriented along a first axis, a first output port configured to provide a first output force based on the input force, and a second output port configured to provide a second output force based on the input force,
wherein a distance between the first output port and the input port along the first axis and in the start position is larger than a distance between the second output port and the input port along the first axis and in the start position.

* * * * *